May 12, 1953  W. W. DOOLITTLE  2,638,176
MARINE SEISMIC SURVEYING
Filed Feb. 23, 1949  2 Sheets-Sheet 1
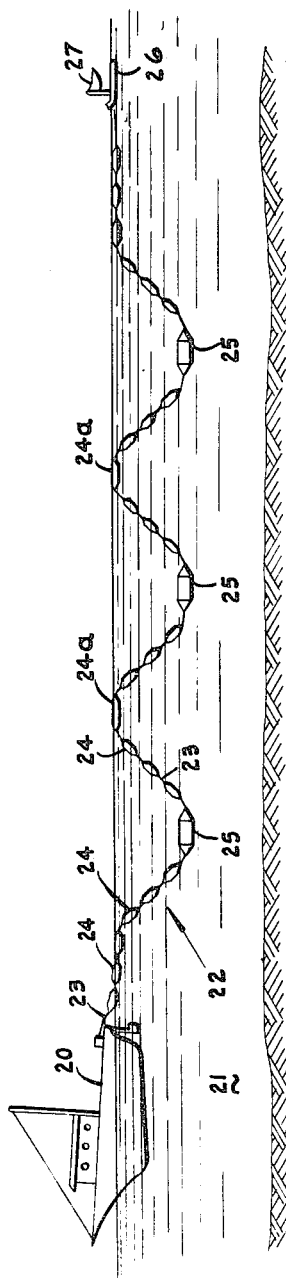
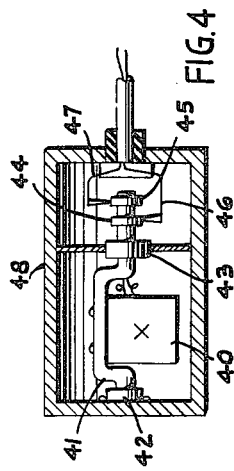
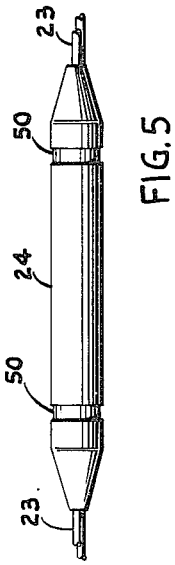
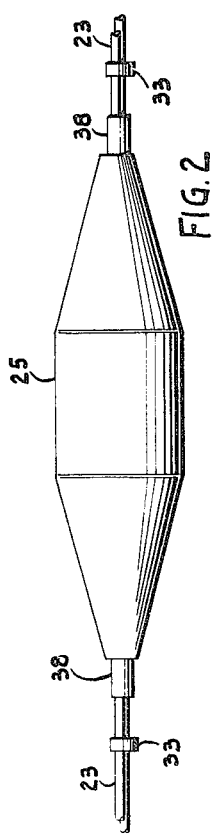
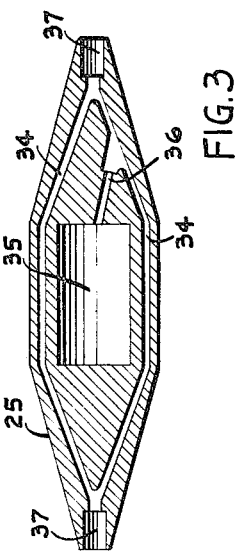
INVENTOR:
WADDIE W. DOOLITTLE
BY Newell Pottorf
ATTORNEY May 12, 1953 — W. W. DOOLITTLE — 2,638,176
MARINE SEISMIC SURVEYING
Filed Feb. 23, 1949 — 2 Sheets-Sheet 2
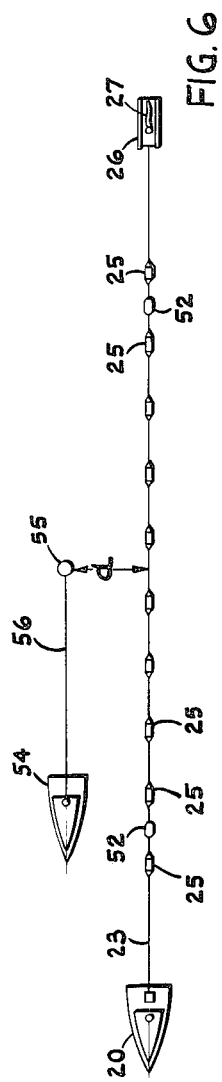
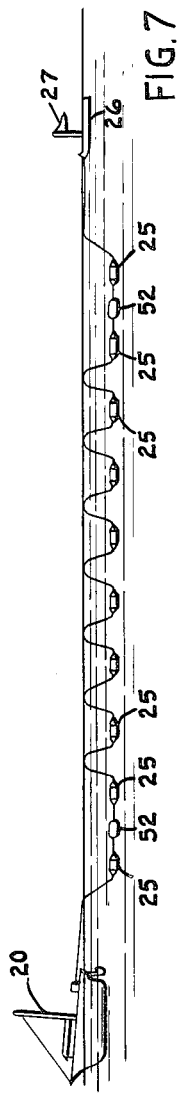
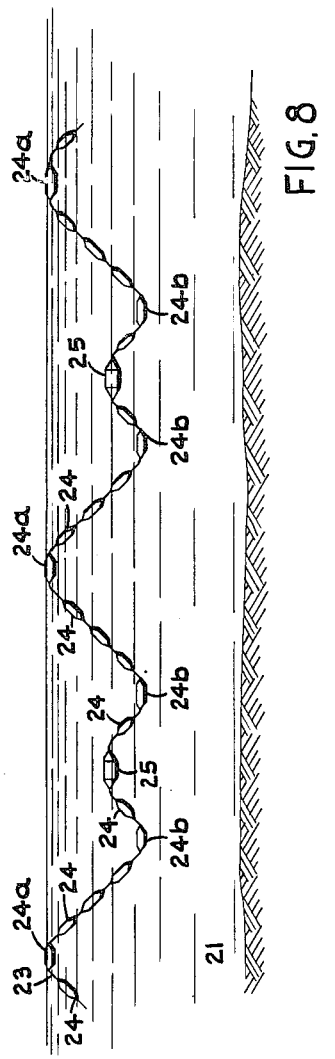
*INVENTOR:*
WADDIE W. DOOLITTLE
BY Newell Pottorf
ATTORNEY Patented May 12, 1953

2,638,176

UNITED STATES PATENT OFFICE 2,638,176

MARINE SEISMIC SURVEYING

Waddie W. Doolittle, Picayune, Miss., assignor to Stanolind Oil and Gas Company, Tulsa, Okla., a corporation of Delaware Application February 23, 1949, Serial No. 77,776

5 Claims. (Cl. 181—.5)

1

This invention relates to geophysical surveying and is directed particularly to prospecting by seismic methods over water-covered areas such as in the Gulf of Mexico. Application Serial No. 122,674, filed October 17, 1949, now Patent No. 2,614,165, is a division of this application.

Geophysical surveying using artificially created seismic waves has been extensively and successfully used on land for a number of years, but it is only comparatively recently that the method has been applied to off-shore exploration for oil and gas in the Gulf of Mexico. In the earliest applications of the seismic method to marine areas the shots and detectors were individually placed on or under the marine floor in much the same manner as in prospecting on land. The results obtained were generally similar to those obtained on land prospects.

With the improvement and adaptation of specific techniques and instruments for this marine work, the speed of prospecting by this method has increased so markedly over what was previously possible either on land or water that, as a result, more than the normal ratio of geophysical effort in marine prospecting has been concentrated on the seismic method, as compared with magnetic and gravimetric methods, for example.

Both now and in the past one of the difficult problems connected with this method has been the proper handling of the seismometers used for detecting the seismic waves. Placing the seismometers at known locations in a spread on the marine floor as in land prospecting, proved even more laborious and time-consuming than on land. Towing a spread of seismometers connected together by a conductor and tension cable along the marine floor or supported by floats behind the recording vessel from one location to another, and shooting either with the seismometers on the marine floor or supported from the floats have resulted in a marked increase in the speed of carrying out the geophysical surveys. However, dragging of the seismometer spread along the sea bottom presents obvious disadvantages in the hazards both to the equipment and to the marine life and installations located on the marine floor. Employing seismometers at or near the surface and supported by floats results in the picking up of a great deal of noise, even under favorable conditions of low wind velocity and relatively smooth water surface. Even in calm seas the noise picked up by float-supported, near-surface detectors is such as to mask most of the desired

2 weak reflections, while on windy days and when the water surface is rough, the noise may be so strong as to override all reflections and make prospecting impossible. As a matter of fact, there are some seasons of the year when the noise conditions from the water surface have been so troublesome that prospecting operations in the Gulf of Mexico were possible only a small fraction of the time. The resultant delays while the crews and equipment are held in readiness for favorable working conditions add very greatly to the expense of the operation.

It is accordingly a primary object of my invention to provide a method and apparatus for marine seismograph prospecting which gives a greatly improved signal-to-noise ratio permitting detection of deeper and weaker desired reflection signals. Another object is to provide a marine prospecting method and apparatus in which the seismometer spread depth is controlled or varied so as to bring the seismometers to the most effective depth for receiving signals. A further object is to provide a marine seismograph prospecting method and apparatus which can operate and obtain good geophysical data under adverse conditions of weather and water such that usable data could not hitherto be obtained. Still another object is to provide a towable marine seismometer spread in which the depth of submergence of the seismometers is float-controlled from the water surface, but in a manner which minimizes the transmission of noise signals to the seismometers. A still further object is to provide a marine seismometer spread which creates a relatively small drag on the towing vessel thereby reducing the travel time between shot points and increasing the speed of the prospecting operation. Still another object is to provide a marine seismometer spread which may be towed close to the water surface between shot points, but at shot points readily lowers the seismometers to the desired depth. Still another and further object of my invention is to provide a marine seismometer spread having good discrimination or filtering against the transmission of longitudinal vibrations along the towing and conductor cable. Other and further objects, uses, and advantages of the invention will become apparent as the description proceeds.

From observations made under a variety of conditions, it has now been found that the range of depths in water where seismometers may be placed for the most efficient operation is relatively narrow. Due to the greatly different seismic-wave transmission properties of water and air, seismic waves traveling upward from the earth below, through the water to its surface, are almost totally reflected there. As a result, there is a strong probability of interference between succeeding waves in a train of seismic waves at a depth in the water which is one-quarter of the average seismic wave length in that medium. To avoid this possible interference, which changes the "character" or appearance of the detected waves, it is therefore desirable to locate the seismometers as close as possible to the water surface. It is at this surface that the displacements are a maximum, and the possibility of interference is a minimum.

As was briefly indicated above, it has been found that the level of noise within the seismic-wave band is a maximum at the water surface, and further that this noise level drops off very sharply with depth. Accordingly, there is for seismometer operation a narrow range of depths, the upper limit of which may be designated as below a "zone of surface noise" and is determined by the depth where the noise level reaches a satisfactorily low value, and the lower limit of which range is the depth at which interference effects become pronounced for waves of interest in the seismic band. This range extends from about 5 feet to about 15 feet, with the preferred depth of operation, at which quite consistently good records are obtained, being about 10 feet.

Although this range accurately represents the presently preferred practice, operations are still possible above it at the expense of introducing into the recorded signals some noise, which may not always be objectionable. A very substantial reduction in the noise level takes place in the first foot or two of the 5-foot surface noise zone, so that many of the advantages of the present invention are retained when operating at such a shallow depth that it can only be said that the seismometers are "substantially below" the water surface. Particularly is this true in the absence of surface floats immediately above the seismometers, which floats are themselves sources of noise as the water moves relative to them, because of waves or currents, for example.

It is conceivable also that some useful results, such as the emphasis of certain reflections, first arrivals, or the like, might be obtained by deliberately locating the seismometers at a depth where interference of a selected wave-length within the seismic band would occur. This invention offers a convenient way of operating at such depths simply by increasing either the time or the rate of seismometer submergence.

Accordingly, the foregoing enumerated and other objects are accomplished in my invention by a marine seismometer spread which is towed near the water surface between shot points and, at a desired location for recording, submerges uniformly and slowly to the desired depth. Upon reaching this depth the shot is fired to initiate the desired signals, and the record is made. According to the preferred embodiment of my invention, seismometer depth control is achieved by adjusting the towing cable or cables, seismometers, and various supporting floats very closely to a neutral buoyancy, with the spread as a whole, however, having a small positive overall buoyancy. This insures that the spread will be near the water surface rather than drag against the bottom as it is pulled along behind the towing vessel. However, the seismometers themselves or portions of the cable near them are slightly negatively buoyant, so that as the towing slows down or comes to a stop at a shot point either by slowing the towing vessel or paying out the cable, the seismometers slowly submerge and finally reach the desired operating depth. The preferred embodiment of this spread, therefore, includes a plurality of spaced seismometers connected by a tension and electrical conductor cable, all having an approximately neutral buoyancy. Portions of the cable, preferably midway, between the seismometers are positively buoyant, while portions between these buoyant sections and either at or near the seismometers are negatively buoyant so as to cause slow submergence as the forward motion of the spread slows or stops.

This will be better understood by reference to the accompanying drawings, forming a part of this application, in which like numerals are applied to the same or corresponding parts in the different figures. In these drawings, Figure 1 is a cross-section of a body of water through which a spread embodying the invention is being towed by a vessel and is shown in a position for recording;

Figures 2 and 3 are respectively elevation and cross-sectional views of a seismometer-supporting float;

Figure 4 is a cross-section of a housing for a gimbal-suspended seismometer;

Figure 5 is an elevation view of a cable supporting float;

Figure 6 is a plan view, and Figure 7 is a cross-sectional view, of a body of water showing a complete spread and shooting apparatus operating in accordance with my invention; and Figure 8 is a cross-section of a body of water showing in part an alternative embodiment of the invention in recording position therein.

Referring now to these drawings in detail and to Figure 1 in particular, a vessel 20 is shown proceeding through a body of water 21 towing a spread 22 constructed in accordance with the invention. Spread 22 is made up of a cable 23, having both strands with a considerable tensile strength for connecting together and towing the various components, and insulated electrical conductors for the detector signal leads. Cable 23 is supported by a plurality of floats 24 spaced at intervals along its length. Also spaced along the cable 23 at any desired intervals, are a number of detector-containing supports or floats 25. The forward end of cable 23 is attached to the vessel 20, while its trailing end is coupled to a float or drag 26 which, by opposing the forward motion of the spread, maintains the cable in tension during towing. It is possible, however, to omit drag 26, as the drag of the spread itself in passing through the water is often sufficient. A flag 27 mounted on float or drag 26 indicates the position of the end of the spread to an observer on vessel 20 so that the spread direction may be ascertained at all times, particularly in the presence of cross-currents.

In accordance with my invention, the spacing and the buoyancy of the cable 23, the cable floats 24, and the seismometer floats 25 are so adjusted that the spread has very nearly a neutral buoyancy in the water. However, the particular cable floats 24a, located about midway between the seismometer floats 25 are slightly positively buoyant, whereas the seismometer floats 25 are similarly negatively buoyant, but in slightly less degree. As an example of the magnitude of suitable relative buoyancy forces, a spread constructed in accordance with my invention was first adjusted to have as nearly as possible a neutral buoyancy over-all. The seismometer floats 25 were then weighted by the addition of 8 ounces of weight each, while the floats 24a were rendered buoyant to the extent of 12 ounces each. This gave a satisfactory positive overall buoyancy and a seismometer submergence time of between 1 and 3 minutes after the towing was discontinued.

By synchronizing the placing of the explosive charge with the manipulation of the spread, there was no difficulty in detonating the charge when, in this time interval, the seismometers reached the proper depth.

It should be noted that the unsupported portions of cable 23 between the floats 24 have a slight amount of sag due to the cable itself being negatively buoyant. This is a definite advantage in that these unsupported cable portions act to reduce the transmission of longitudinal vibrations along the cable, particularly when the cable tension is very small, as it is in the recording position. In addition, the individual floats 24 themselves, having a small but definite drag which opposes motion through the water, cooperate with the unsupported lengths of cable 23 in absorbing longitudinal vibrations. These two effects, plus the fact that the buoyant portions of cable 23 and floats 24a which are at or near the water surface are located at a considerable lateral distance from the seismometer floats 25, result in substantially zero transmission of surface water noises to the seismometers.

One of these seismometer floats 25 is shown in more detail in Figures 2 and 3. As shown in Figure 2, the float is preferably elongated and provided with pointed ends so as to be towed easily through the water. It is everywhere circular in cross-section to avoid any tendencies to float or dive during towing and so it streams smoothly directly back from the point of application of towing force. The buoyancy of float 25 is adjusted by adding or removing small straps of lead 33 wrapped around the cable 23 where it emerges from the pointed ends of the floats. As shown by Figure 3, the float is preferably constructed in two sections or halves which are fastened together, the interior being provided with one or more slots or passages 34, through which the cable or cables 23 are threaded from end to end, and a central chamber 35 which houses the seismometer assembly. A passage 36, extending between one of the cable slots 34 and the enclosure 35, provides for a waterproof splice and insulated lead from the conductor cable 23 to the seismometer. Enlarged openings 37 at the float ends hold resilient sleeves 38 which inhibit sharp bending and breakage of the cable where it enters or leaves the float.

In Figure 4 is shown a suitable seismometer assembly consisting of a seismometer 40, gimbal-mounted in a frame 41 which is set in a pair of anti-friction bearings 42 and 43. The electrical leads from seismometer 40 are brought out through bearing 43 to a pair of slip-rings 44 and 45 which are contacted by brushes 46 and 47 connected suitably to insulated leads in the cable 23 through the splice and insulated lead extending through passage 36. This seismometer assembly is housed in a water-tight cylindrical housing 48 which fits into the cavity 35 in float 25. Being mounted with the center of gravity of the system at $x$ below the axis of bearings 42 and 43, the seismometer is free to rotate about this axis, and it therefore remains upright at all times despite any possible rotation of float 25 about cable 23 as an axis. Rotations of seismometer 40 about axes perpendicular to cable 23 are generally negligible because of the cable tension and the streamlined construction of floats 24 and 25.

A typical cable-supporting float 24 is shown in Figure 5. This may be constructed like seismometer float 25, rounded or pointed at the ends and in two halves provided with longitudinal slots and clamped together around cable 23 as by means of encircling metal bands 50, or fastened together by bolts or screws.

The plan view of Figure 6 and the sectional view of Figure 7, showing the spread of Figure 6 in shooting position in a body of water, illustrate a complete spread and an auxiliary shooting vessel in the relative positions occupied during operations. For simplicity, the cable floats 24 have been omitted from these figures and only the seismometer floats 25 are shown. Ten seismometers are employed spaced uniformly apart by distances of 200 to 250 feet except for the two seismometers at each end of the spread, which are spaced between 50 and 100 feet apart. Each of these end seismometer pairs is designed to operate and submerge as a unit, and its depth of submergence is indicated by a remote-indicating depth-gauge unit 52 located midway between the two seismometers of each pair.

In a typical method of operation, the vessel 20 and spread 22 are accompanied along a parallel course by an explosives-carrying vessel 54. As spread 22 approaches a proposed shot-point location, towing by vessel 20 is discontinued so that the spread slows down and comes to a stop at the desired position relative to the shot point. Seismometers 25 then begin to submerge slowly. Vessel 54 places an explosive charge 55 and pays out a firing line 56, the charge being suitably supported by floats or otherwise either above or below the water surface, and being opposite the center and normally offset from the line of spread 22 by the distance $d$ of the order of 300 feet. As soon as the seismometers, which have continued to sink, reach the desired depth immediately below the zone of surface water noise—which normally occurs in from one to two minutes, but may require more or less time in the presence of aiding or opposing water currents—charge 55 is detonated, and the seismic wave record is made. The readings of the depth gauges located in each of the units 52 appearing on direct-reading electric meters at the recording location are noted but are not necessarily recorded automatically on the record. As soon as the record is completed, towing of the spread is immediately resumed, and the seismometer floats 25 rise up and tow near the surface while traveling to the next shot point.

In the embodiment illustrated in Figure 8, the buoyancy of the various sections of the spread is distributed somewhat differently from that which has just been described. The cable float 24a, midway between two seismometer floats 25, is the point of the spread having the greatest positive buoyancy, as in the previous embodiment. However, instead of making the seismometer float 25 the most negatively buoyant section, it is preferably neutral or even slightly positively buoyant, and two of the cable floats 24b located near and on each side of the seismometer float 25 are made negatively buoyant by an amount sufficient to make float 25 submerge. The two sagging cable portions extending from the positively buoyant float 24a through the negatively buoyant float 24b to the neutral or positively buoyant seismometer float 25, and thence to the next buoyant float 24a, offer an increased length of path for the attenuation of longitudinal vibrations transmitted along the cable 23.

The operation of this arrangement is the same as for that previously described, except that the seismometer floats 25 may submerge somewhat more slowly than in the first embodiment. The floats 24b in this arrangement submerge most rapidly and pull down seismometer float 25 at a somewhat slower rate. By having the seismometer float 25 positively buoyant, it is more certain that during towing it will run at the surface of the water and hence be out of danger. Furthermore, as for a given depth of submergence of the floats 25 there must be a greater shortening of the length of the entire spread, it is apparent that the relative buoyancies of the units are less critical than in the previous embodiment.

While my invention has been thus described in terms of the foregoing specific embodiments, it is to be understood that these are merely for purposes of illustration, and that many other modifications of the invention will occur to those skilled in the art.

For example, any number of seismometers other than ten, and any other spacing pattern of seismometers within the spread could be employed. Similarly, a wide variety of relative arrangements of spread and shotpoint are possible. Likewise, although only single floats, as 24a or 24b, have been described as being made positively or negatively buoyant, the desired buoyancy properties could be distributed over several adjacent floats making a whole section of the cable float or submerge. The invention, therefore, is not to be considered as limited to the specifically described details, but is to be ascertained from the scope of the appended claims.

I claim:

1. The method of seismic surveying in water-covered areas which comprises positioning a spread of seismic-wave detectors spaced along a towing and conductor cable near the water surface at a desired location, supporting at the water surface portions of said cable between and laterally distant from each of said detectors, slowly lowering said detectors and the portions of said cable adjacent to each detector through the water below said water surface, generating seismic waves, and receiving the resultant seismic waves reaching said detectors while they are sinking.

2. The method of seismic surveying in water-covered areas which comprises positioning a spread of seismic-wave detectors spaced along a towing and conductor cable near the water surface at a desired location, supporting at the water surface portions of said cable between and laterally distant from each of said detectors, slowly lowering said detectors and the portions of said cable adjacent to each detector through the water below said water surface, generating seismic waves, and receiving the resultant seismic waves reaching said detectors while they are sinking within a range of depths extending from about 5 to about 15 feet.

3. The method of seismic surveying in water-covered areas which comprises towing a spread of seismic-wave detectors spaced along a towing and conductor cable through the water near the water surface, supporting at the water surface portions of said cable between and laterally distant from each of said detectors, discontinuing the towing as said spread approaches a desired location for recording seismic waves, slowly lowering said detectors and substantially all of said cable except said distant portions through the water below said water surface, generating seismic waves when said detectors are at a substantial depth below the surface of the water, and recording the resultant seismic waves reaching said detectors while they are sinking.

4. The method of seismic surveying in water-covered areas which comprises proceeding with a vessel along a given course through the water while towing a spread of seismometers spaced along a towing and conductor cable near the water surface, supporting at the water surface portions of said cable between and laterally distant from each of said seismometers, slowly lowering said seismometers and substantially all of said cable except said distant portions through the water below said water surface as said spread approaches a desired location relative to a shot point, placing an explosive charge at said shot point in timed relation to said seismometer-lowering step, detonating said charge when said seismometers have reached a depth below the zone of surface water noise, and recording the resultant seismic waves reaching said seismometers while they continue slowly sinking.

5. The method according to claim 4 in which said charge is detonated when said seismometers reach a depth below the zone of surface water noise and before they reach a depth which is about one-quarter of the wave length in water of the highest frequency seismic wave to be detected.

WADDIE W. DOOLITTLE.

References Cited in the file of this patent

UNITED STATES PATENTS

| Number | Name | Date |
| --- | --- | --- |
| 2,241,428 | Silverman | May 13, 1941 |
| 2,283,200 | Flude | May 19, 1942 |
| 2,423,591 | Flude | July 8, 1947 |
| 2,449,085 | Peterson | Sept. 14, 1948 |
| 2,465,696 | Paslay | Mar. 29, 1949 |
| 2,544,819 | Babb et al. | Mar. 13, 1950 |